(12) United States Patent
Golomb et al.

(10) Patent No.: US 6,375,450 B1
(45) Date of Patent: Apr. 23, 2002

(54) EXTRUSION APPARATUS FOR CERAMIC HONEYCOMB ARTICLES

(75) Inventors: Nancy A. Golomb; Christopher J. Malarkey, both of Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/527,731

(22) Filed: Mar. 17, 2000

(51) Int. Cl.[7] .......................... B29C 47/50; B29C 47/40
(52) U.S. Cl. .......................... 425/199; 366/87; 425/205
(58) Field of Search ................. 264/177.11, 177.12, 264/211.23, 211.21, 630, 631, 634, 639; 425/190, 197, 198, 199, 205; 366/87

(56) References Cited

U.S. PATENT DOCUMENTS

| | | |
|---|---|---|
| 2,336,734 A | 12/1943 | Jellinek |
| 3,390,216 A | 6/1968 | Kaoru Umeua et al. |
| 3,745,200 A | 7/1973 | Geyer |
| 3,749,375 A | 7/1973 | Hermann et al. |
| 3,856,278 A | 12/1974 | Eisenmann |
| 3,888,963 A | 6/1975 | Orso et al. |
| 4,090,829 A | * 5/1978 | Fischer et al. ................. 425/73 |
| 4,127,372 A | * 11/1978 | Perla et al. ............... 425/131.1 |
| 4,299,499 A | 11/1981 | Buchheit |
| 4,551,295 A | 11/1985 | Gardner et al. |
| 5,174,725 A | 12/1992 | Guile et al. |
| 5,213,737 A | 5/1993 | Ford et al. |
| 5,253,994 A | * 10/1993 | Zweig et al. ................ 425/130 |
| 5,332,379 A | * 7/1994 | Baumgarten ................. 425/107 |
| 5,811,048 A | * 9/1998 | Dunn et al. ............. 264/177.11 |
| 6,284,188 B1 | * 9/2001 | Andou et al. ................ 264/631 |

* cited by examiner

*Primary Examiner*—Mark Eashoo
(74) *Attorney, Agent, or Firm*—Anca C. Gheorghiu

(57) ABSTRACT

An improvement in a process of making honeycomb articles, which process utilizes a co-rotating, intermeshing twin screw extrusion apparatus to mix, screen, and extrude a batch of ceramic materials through a die, the improvement which comprises the steps of separating the mixing and screening phase from the extrusion phase, by passing the batch through a first co-rotating, intermeshing twin screw extruder or a mixer extruder to mix and screen the batch, and then directly passing the mixed and screened batch through a second co-rotating, intermeshing twin screw extruder or a pumping extruder to extrude said batch through a die assembly to produce a honeycomb article.

10 Claims, 4 Drawing Sheets

EXTRUSION APPARATUS FOR CERAMIC HONEYCOMB ARTICLES

BACKGROUND OF THE INVENTION

This invention relates to an improvement in a method for extruding ceramic honeycomb articles, in particular ultra-thinwall ceramic honeycomb articles having 4 mil cell walls or less, and an apparatus for carrying out the same.

Twin screw extruders are commonly employed in the manufacturing of ceramic honeycomb articles. U.S. Pat. No. 4,551,295, herein incorporated by reference in its entirety, is directed at a method of using a twin screw extruder to produce cordierite or cordierite-mullite honeycomb cellular substrates for employment as catalytic converters in automotive engines.

In an effort to meet the demands of ever tighter emission standards, automobile manufacturers are requiring honeycomb cellular substrates with thinner cell walls to provide increased geometric surface area and faster lightoff properties.

A problem which presently exists in the manufacturing of ultra-thinwall honeycomb cellular substrates having 4 mil cell walls or less is die plugging. Die plugging leads to missing webs and non-knitting webs in the substrates thus rendering them unusable and resulting in high production losses. It is believed that large particles and/or contaminants pass through the twin screw extruder screen, enter the die and plug the die slots.

Finer screens may be used to filter out the majority of particles and/or contaminants which would otherwise lead to die plugging. This solution, however, is not ideal because finer screens more readily blind or plug-up and as such cause instability in the extrusion process which is created when the profile of the screen is changed. Plugged screens induce process and production losses. Further the pressures created in a twin screw extruder having a fine screen coupled to or immediately upstream from the die often exceed the pressure limitation of the apparatus causing system failure.

Therefore, it would be advantageous to eliminate the aforementioned problems of die plugging and process instability in the manufacturing of ultra-thinwall honeycomb cellular substrates having a wall thickness of 4 mill or less.

As such, it is an object of the present invention to provide an improvement in a process for making ceramic honeycomb articles, and in particular in a process for making ceramic ultra-thinwall honeycomb articles having 4 mil cell walls or less, without the aforementioned problems.

PRIOR ART

U.S. Pat. No. 2,336,734 (Jellinek) discloses an extrusion process which involves a preliminary extrusion step to plasticize the batch before final extrusion. Either the entire batch or some portion of the batch is first pre-worked to a desired plasticity in a single screw extruder, formed into strands and then subsequently re-extruded into a final article in another single screw extruder.

U.S. Pat. No. 3,390,216 (Umeya et al.) discloses an extrusion process for ceramic materials which involves pre-shaping a batch in an auger extruder, immediately thereafter passing the batch through a vacuum chamber for degassing, and then subsequently extruding to a final article through a piston extruder while at the same time maintaining the batch in a degassed state.

U.S. Pat. No. 3,745,200 (Geyer) discloses an extrusion process for thermoplastic materials which involves two worm-type extruders. One extruder is used in the conventional way, with the second extruder being employed to receive and regenerate portions of the batch from the conventional extruder back into the conventional extruder at regular intervals.

U.S. Pat. No. 3,888,963 (Orso et al.) discloses a discontinuous extrusion process in which a homogenizing assembly is used to break up and homogenize interfaces between adjacent charges of batch material.

U.S. Pat. No. 5,213,737 (Ford et al.) discloses an extrusion process for powdered materials which involves having one or more gear pumps in succession between the extruder and the die. In one embodiment, the batch is pre-worked in a twin screw extruder and then transferred to a single screw extruder for being fed to the gear pumps and for final forming.

SUMMARY OF THE INVENTION

In accordance with one aspect of the present invention, there is provided an improvement in a process of making honeycomb articles, which process utilizes a co-rotating, intermeshing twin screw extrusion apparatus to mix, screen, and extrude a batch of ceramic materials through a die, the improvement which comprises the steps of separating the mixing and screening phase from the extrusion phase, by passing the batch through a first co-rotating, intermeshing twin screw extruder or a mixer extruder to mix and screen the batch, and then directly passing the mixed and screened batch through a second co-rotating, intermeshing twin screw extruder or a pumping extruder to transport and force the batch through a die assembly to produce a honeycomb article.

In accordance with another aspect of the invention, there is provided an apparatus for extruding a ceramic honeycomb article comprising a first co-rotating, intermeshing twin screw extruder or a mixer extruder for mixing and screening a batch of ceramic material, the first twin screw extrusion apparatus comprising a first feed inlet at one end, a first discharge outlet at the other end, and a filtering screen detachably mounted adjacent the first discharge outlet; a second co-rotating, intermeshing twin screw extruder or a pumping extruder downstream from the mixer extruder for transporting and forcing the batch through a die assembly, the pumping extruder comprising a second feed inlet at one end corresponding to the first discharge outlet of the first twin screw extruder and a second discharge outlet at the other end; means for linking the mixer extruder to the pumping extruder; and, a die assembly attached to the second discharge outlet of the pumping extruder for producing a honeycomb article.

DETAILED DESCRIPTION OF THE PRESENT INVENTION

The present invention provides an improvement in a process of making ceramic honeycomb articles, the method being providing a ceramic material in the form of a batch and passing the batch through a twin screw extrusion apparatus to mix, screen, de-air, convey and force the batch through a die assembly. The improvement lies in uncoupling the mixing and screening phase from the extrusion phase. This is achieved by passing the batch through a first twin screw extrusion apparatus or a mixer extruder which is used for the mixing and screening of the batch, subsequently followed by a transfer of the batch to a second twin screw extrusion apparatus or a pumping extruder which is used to extrude the batch through a die assembly.

The terms "extrusion phase" or "extrude" as used herein mean the conveying or transporting of the batch through the barrel of the extruder, and forcing of the batch through the die assembly.

The term "batch" as used herein means a wet mixture of dry ceramic raw materials, such as clay, talc, alumina and mullite, a binder/plasticizer, such as polyvinyl alcohol, and/or water. Typically in a batch there are between about 50–75% by weight dry ingredients and between about 25–50% by weight wet ingredients. The batch when reacted forms a ceramic material such as carbides, or refractory oxides. Preferably, the batch when reacted forms cordierite ($2MgO.2Al_2O_3.5SiO_2$).

Figure 1:
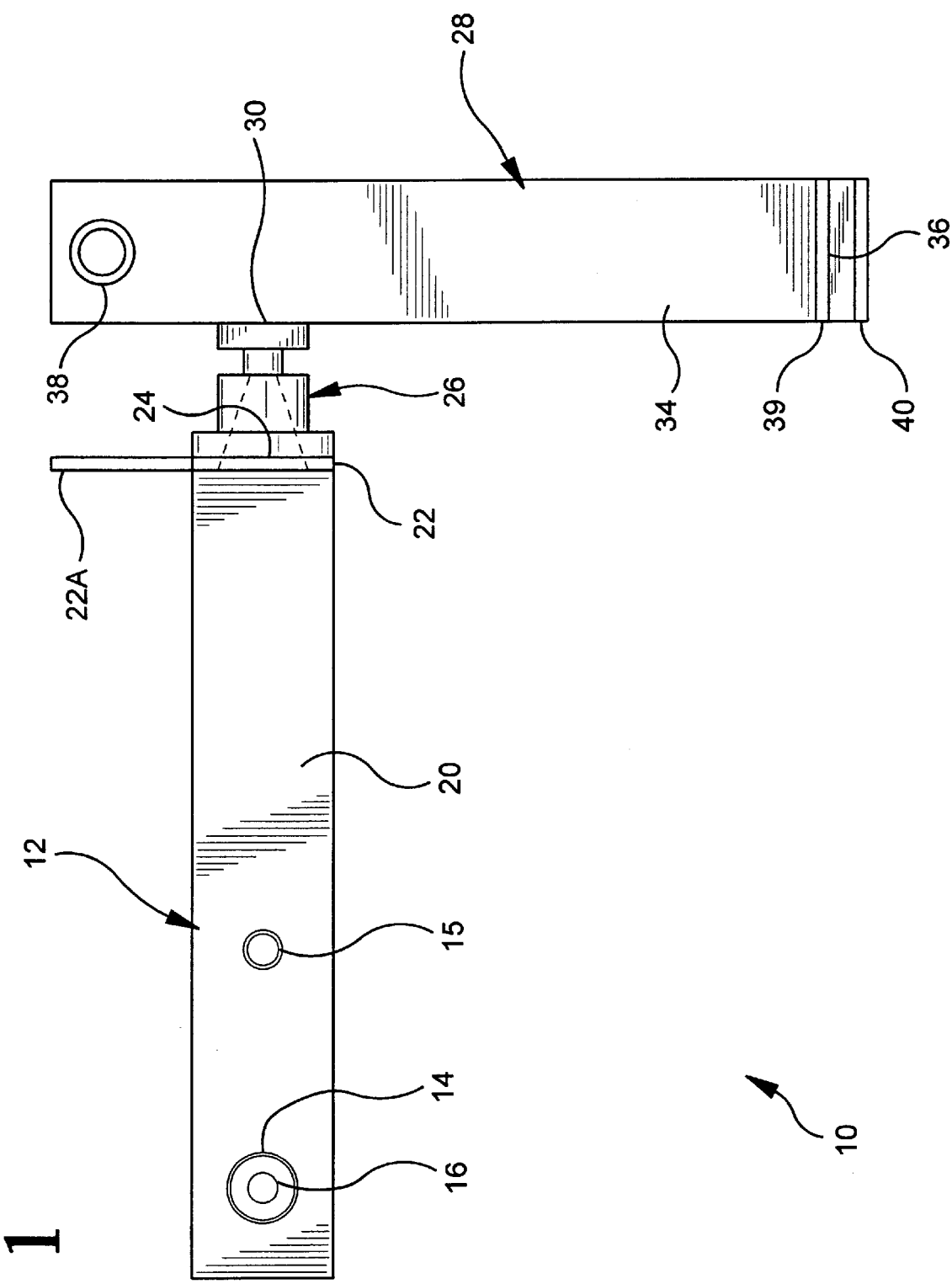
FIG. 1 is a top view of an apparatus embodying the teachings of the present invention.
Figure 2:
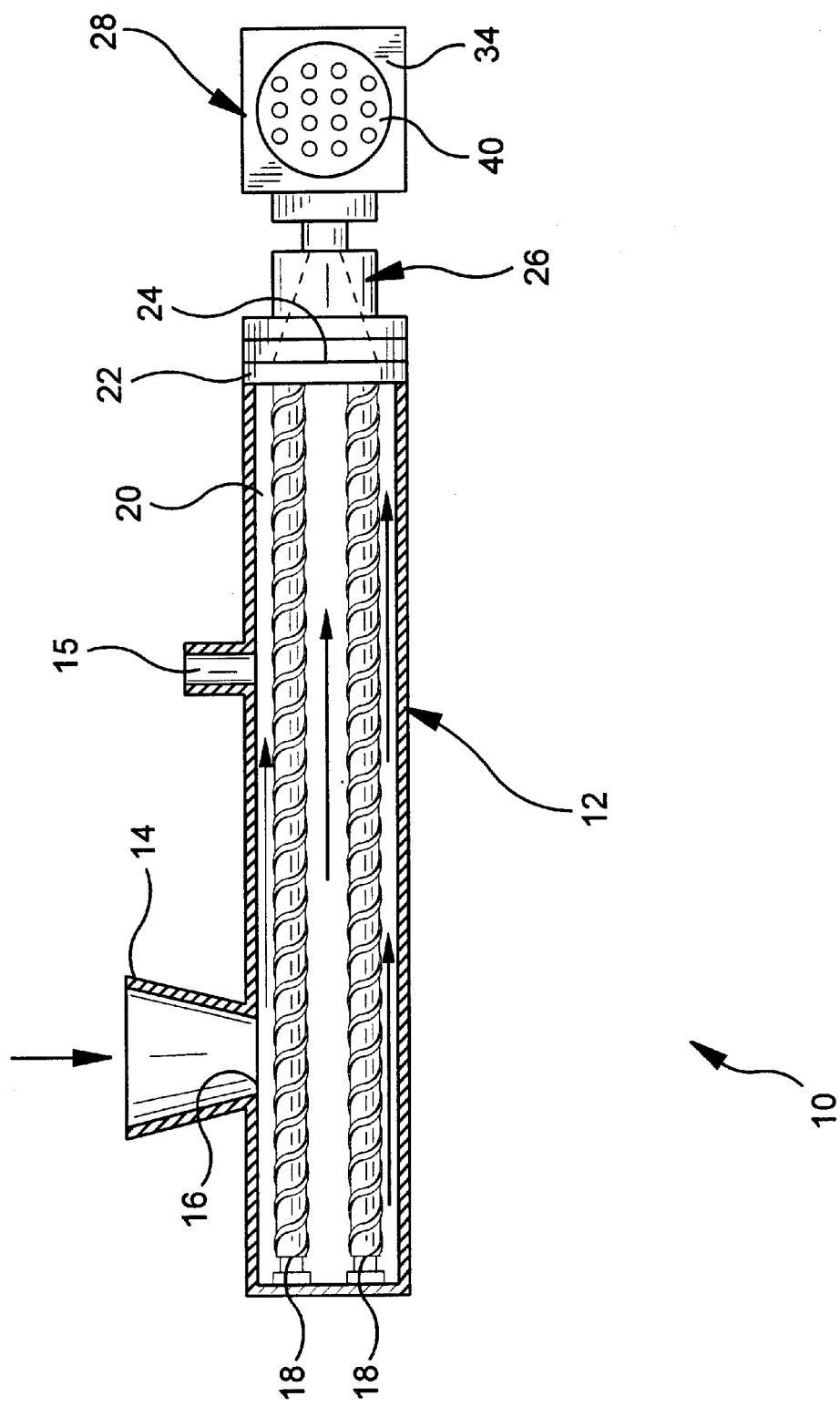
FIG. 2 shows the first twin screw extruder in cross-section and the second twin screw extruder in elevation.
Figure 3:
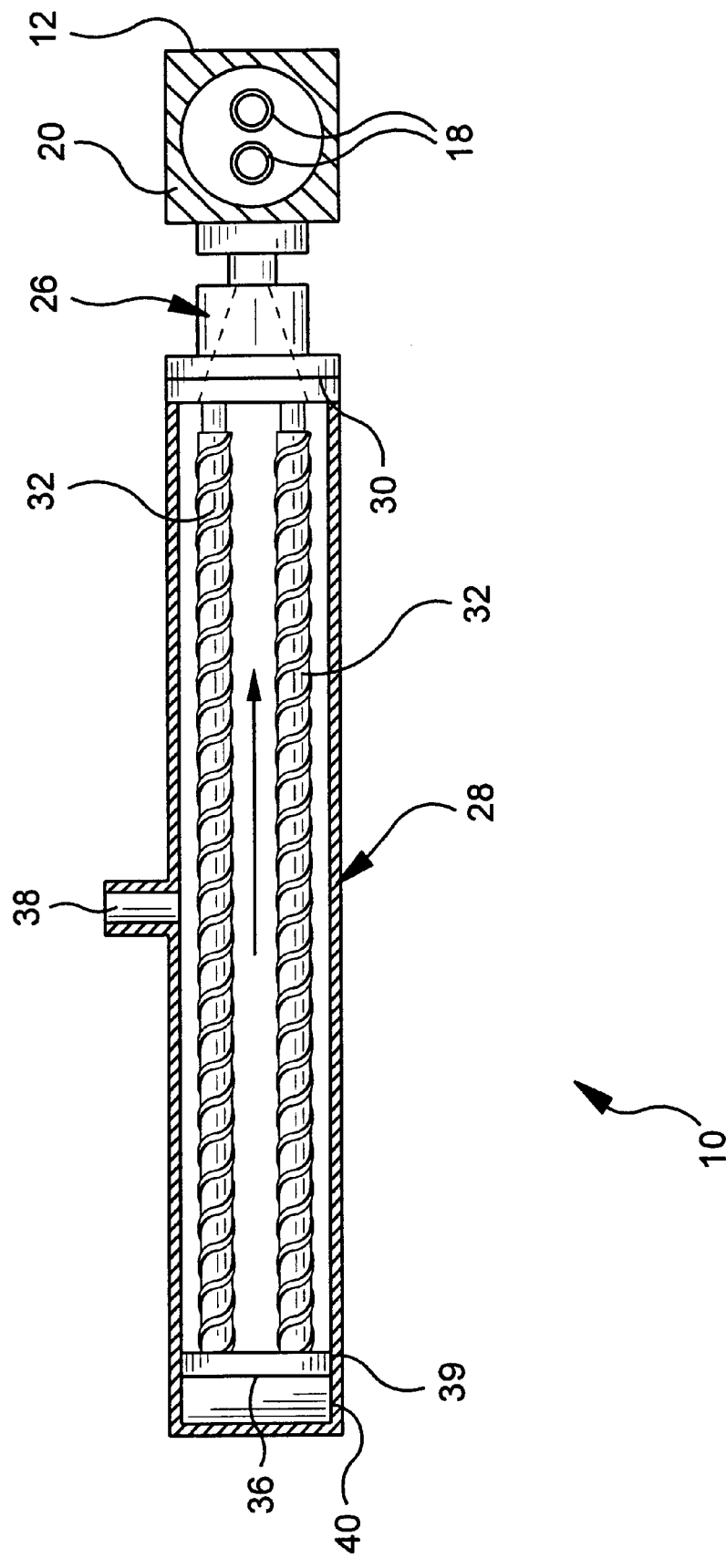
FIG. 3 shows the first twin-screw extruder in elevation and the second twin screw extruder in cross-section.

Referring now to FIGS. 1, 2 and 3 shown at 10 is an apparatus embodying the present invention. Once the desired batch is made up, it is fed into first twin screw extruder 12 through a device such as hopper 14, positioned at first feed inlet 16, where it is picked up by screws 18 in barrel 20. The screws can be co-rotating or counter-rotating, intermeshing or non-meshing. Preferably, the screws are co-rotating, intermeshing, self-cleaning screws.

The first twin screw extruder 12 functions to mix and screen the batch. More specifically screws 18 act to mix, shear and plasticize the batch. Concurrently, the batch runs the length of barrel 20 in the direction of the arrows as shown, and passes through filtering screen 22. The pressure required to pass the batch through the filtering screen, i.e., the screening pressure depends on the screen size. The batch may be passed through the filtering screen 22 at pressures up to 5000 psi, and preferably at about 2000 psi.

Filtering screen 22 which is positioned upstream from and detachably mounted adjacent first discharge outlet 24, has a screen size with openings of between about $30 \mu m$ and $100 \mu m$. It is the purpose of filtering screen 22 to cleanse the batch of particles and/or contaminants which would otherwise plug slots in the die resulting in defects in the honeycomb structure and ultimately product failure. When filtering screen 22 becomes plugged such that batch no longer uniformly passes through, a new filtering screen 22A replaces the plugged screen. The screen change may be performed in any number of ways including manually replacing a plugged screen with a new one; or automatically changing the screens with a device which contains a plurality of screens (not shown).

A vacuum, as known in the art, may be pulled on the batch while in the first twin screw extruder 12 at first vent port 15, to de-air or remove trapped air from the batch before it enters second twin screw extruder 28. De-airing, however, results in a stiffer batch which requires more pressure to pass through filtering screen 22. It is contemplated, however, that excess wet ingredients, i.e., water/solvent, may be added to lower the batch viscosity in order to facilitate easier passage through filtering screen 22. Preferably, no more than 25–50% by weight wet ingredients are added. This excess wetness can then be removed from the batch in the second twin screw extruder 28 by pulling a vacuum and/or heating the batch, as known in the art.

Following the mixing, shearing, plasticizing and screening of the batch in first twin screw extruder 12, the batch exits first twin extruder 12 at first discharge outlet 24 and enters second twin screw extruder 28 at second feed inlet 30.

Second twin screw extruder 28 is positioned downstream from first twin screw extruder 12. In a preferred embodiment second twin screw extruder 28 is perpendicularly mounted in respect to first twin screw extruder 12.

Shown at 26 are means for connecting first twin screw extruder 12 to second twin screw extruder 28, more specifically an adapter device having a front end 25 and a back end 27. Front end 25 is attached to first discharge outlet 24 and back end 27 is attached to second feed inlet 30, such that first extruder 12 is connected to second extruder 28. Adapter device 26 is a conduit, a pipe-like structure, which facilitates the feeding of the batch from first extruder 12 into second extruder 28.

Figure 4:
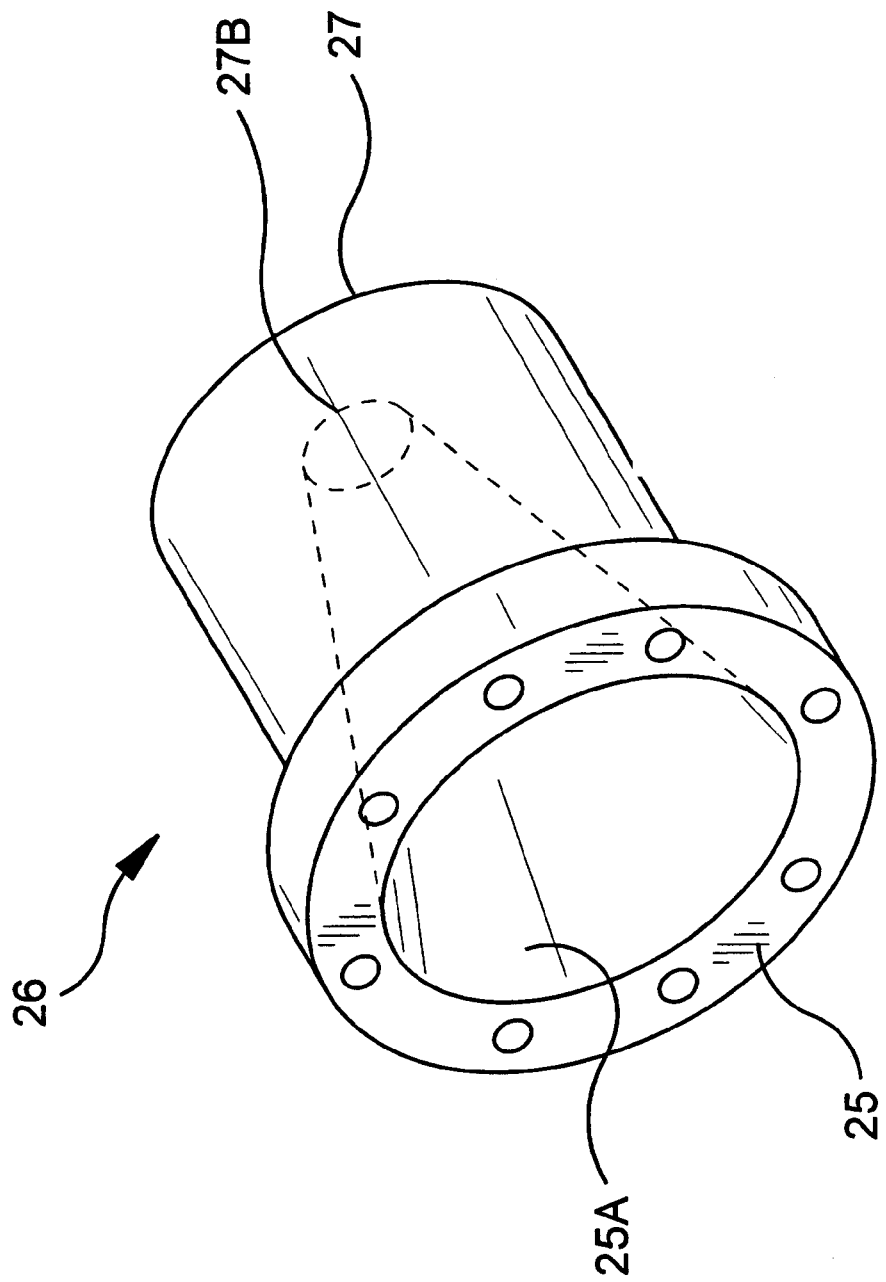
FIG. 4 shows a perspective view of the adapter device of the apparatus of the present invention.

Referring now to FIG. 4, the preferred shape of adapter device 26 is shown; more specifically, adapter device 26 has a front end 25 having a front hole 25A and a back end 27 having a back hole 27B, such that front hole 25A is greater than back hole 27B, i.e., the interior of adapter device 26 is funnel-like. In this preferred embodiment "dead-zones" in which batch passes over batch are eliminated.

Even though the preferred embodiment of the present invention shows adapter device 26 for connecting first extruder 12 to second extruder 28, it is also contemplated that the connection between first extruder 12 and second extruder 28 may be attained in an alternate way, for example by directly attaching the two extruders together.

Once the batch enters second twin screw extruder 28 at second feed inlet 30, it is picked up and carried by screws 32 in barrel 34. Screws 32 act to transport the batch throughout the length of barrel 34 towards second discharge outlet 36 and ultimately die assembly 40.

The second twin screw extruder 28 functions to de-air and build pressure in the batch, such that the batch is conveyed and ultimately forced through die assembly 40. The batch is de-aired by applying a vacuum at second vent port 38, as known in the art. The de-airing step is performed to remove trapped air and to ensure that the batch is compacted before it enters the die assembly 40.

Pressure is built up in the batch to force the batch through die 40. This pressure required to force the batch through the die, i.e., the extrusion pressure, depends on such factors as the type of material and the type of product that is to be extruded, and also on the type of die extrusion that is to be used. In the apparatus of the present invention much higher extrusion pressures may be achieved across the die assembly, when compared to prior art twin screw extruders because the pressure capability of the second twin screw extruder 28 is used solely to force the batch through the die assembly 40. Whereas, in a conventional twin screw extruder its pressure capability is used to pass the batch through the screen and to force the batch through the die. As a result, the extruder is not capable of accommodating the pressure drop across both the screen and the die. Therefore, in the apparatus of the present invention where the screening/mixing step is decoupled from the extrusion step there is more control over the batch pressure across the die. In the present process the batch may be pressurized up to about 5000 psi, and preferably at about 2500–3000 psi.

As the batch exits through second discharge outlet 36 it is forced through die assembly 40 to form honeycomb structures of any cell density and wall thickness, however, preferably ultra-thinwall honeycomb structures of 4 mil cell walls or less.

In another embodiment, before the batch enters die assembly 40 it passes through die protection screen 39. Die-protection screen 39 is a course screen which acts to guard die assembly 40 against objects which could cause damage to the die, such as metal worn off the barrel or loose machine parts. Die-protection screen 39 is detachably mounted adjacent die assembly 40, and has a course screen size with openings greater than 100 µm, preferably greater than 120 µm.

To more fully illustrate the invention, the following non-limiting example is presented.

EXAMPLE

The process and apparatus of the present invention has been successfully utilized as presented in the following example.

The batch is made of ceramic raw materials, extrusion aids, and water such that once formed into the honeycomb shape, and fired, it will form cordierite; for example a mixture is made up of the following parts: about 41 of talc, about 15 of kaolin, about 26–27 of calcined kaolin, about 15 of alumina, about 2 of silica, about 3 of methylcellulose as binder, about 0.5 sodium stearate as wetting agent, and about 30 of water, preferably deionized water. The composition can vary somewhat depending on the desired properties, for example, Theological properties.

The materials are dry blended in a mixer such as a Littleford blender to provide a homogeneous mix. The water is then added by spraying it rapidly into the blender to disperse it uniformly. The time for addition of the water is short, to prevent the damp mixture from beginning to compact and plasticize. At this point, the batch is in the form of a damp powder. The batch is then fed at a constant rate into the first twin screw extruder, where it is picked up by the co-rotating and intermeshing screws. The first twin screw extruder receives the batch, where it is mixed, sheared and plasticized as it moves through the barrel. A vacuum is pulled in the first twin screw extruder to de-air the batch. The batch is compacted and then passed through the filtering screen, at a pressure of about 2000 psi. As the mixture exits the filtering screen it passes through the adapter device and enters the second twin screw extruder.

A vacuum is pulled in the second twin screw extruder to de-air the batch of any air that may be introduced upon entrance to the second twin screw extruder. The second twin screw extruder also has co-rotating, intermeshing screws. The batch is transported by the screws down the barrel of the extruder, passes through the die-protection screen and then through the die.

In the second twin screw extruder pressure is built up to extrude the batch through the die, at about 2500–3000 psi. The extruded shape is that of a honeycomb cellular structure.

In laboratory experiments honeycombs with a cell density of as high as about 900 cells/in$^2$ and a cell wall thickness of as low as about 2 mill have been extruded on the apparatus of the present invention.

An advantage of the present invention is that higher pressures can be achieved across the filtering screen and the die, when compared to a single twin-screw extrusion process. Since the filtering screen is decoupled from the die assembly there is no longer a pressure drop across the filtering screen before the batch enters the die. Therefore, the pressure capability of the second twin screw extruder can be fully utilized to convey the batch and force it through the die assembly. Whereas, in the prior art where the filtering screen is positioned immediately upstream from the die, the pressure forming capability of the extruder can not accommodate the pressure drop across the filtering screen before the batch is forced through the die.

Another advantage of the present invention is a more stabilized and controlled process for continuously extruding honeycomb ceramic articles and in particular continuously extruding ultra-thinwall honeycomb ceramic articles having cell densities of 400–2000 cell/in$^2$ and cell wall of 4 mil cell or less. The batch can be run with less water in the pumping extruder which results in a stiffer wet product. A lower viscosity batch, which is not de-aired can be passed more easily through the filtering screen, thus reducing the pressure across the screen and increasing the process stability. A blinded filtering screen can be replaced with a new one without inducing processes losses.

It is also contemplated that in the present invention an improvement in material utilization of about greater than 5% would occur over a conventional single twin screw extrusion process. Further, standard raw material batches can be utilized without the need for the development of new compositions having finer particle size distributions because plugged filtering screen changes can now be accomplished quickly and without process losses.

Although the present invention has been fully described by way of examples, it is to be noted that various changes and modifications will be apparent to those skilled in the art. Therefore, unless otherwise such changes and modifications depart from the scope of the present invention, they should be construed as included therein.

What is claimed is:

1. An apparatus for extruding a ceramic honeycomb article comprising:

a first co-rotating, intermeshing twin screw extruder for mixing and screening a batch of ceramic material, said first twin screw extrusion apparatus comprising a first feed inlet at one end, a first discharge outlet at the other end, and a filtering screen detachably mounted adjacent said first discharge outlet;

a second co-rotating, intermeshing twin screw extruder downstream from said first twin screw extruder for extruding said batch through a die assembly, said second twin screw extruder comprising a second feed inlet at one end corresponding to said first discharge outlet of said first twin screw extruder and a second discharge outlet at the other end;

means for linking said first co-rotating, intermeshing twin screw extruder to said second co-rotating, intermeshing twin screw extruder;

a die assembly attached to said second discharge outlet of said second twin screw extruder for producing a honeycomb article.

2. The apparatus of claim 1 wherein said means for linking said first twin screw extruder to second twin screw extruder include an adapter device.

3. The apparatus of claim 1 wherein said adapter device has a front end and a back end.

4. The apparatus of claim 3 wherein said front end has a front hole and said back end has a back hole.

5. The apparatus of claim 4 wherein said front hole is greater than said back hole.

6. The apparatus of claim 3 wherein said front end of said adapter device is attached to said first discharge,outlet of said first twin screw extruder and said back end of said adapter device is attached to said second feed inlet of said second twin screw extruder.

7. The apparatus of claim 1 wherein said second co-rotating, intermeshing twin screw extruder further includes a die-protection screen detachably mounted adjacent said second discharge opening.

8. The apparatus of claim 7 wherein said die-protection screen has a screen size with openings of greater than 120 $\mu$m.

9. The apparatus of claim 1 wherein said filtering screen has a screen size with openings of between 30 $\mu$m and 100 $\mu$m.

10. The apparatus of claim 1 wherein said second twin screw extruder is perpendicularly mounted to said first twin screw extruder.

* * * * *

UNITED STATES PATENT AND TRADEMARK OFFICE
CERTIFICATE OF CORRECTION

PATENT NO. : 6,375,450 B1
DATED : April 23, 2002
INVENTOR(S) : Golomb et al.

It is certified that error appears in the above-identified patent and that said Letters Patent is hereby corrected as shown below:

<u>Column 7,</u>
Line 6, "discharge,outlet" should be -- discharge outlet --

Signed and Sealed this

First Day of October, 2002

Attest:

Attesting Officer

JAMES E. ROGAN
Director of the United States Patent and Trademark Office